(12) United States Patent
Nagarajan et al.

(10) Patent No.: US 12,185,380 B2
(45) Date of Patent: Dec. 31, 2024

(54) METHOD AND UE FOR CONTROLLING 2-STEP AND 4-STEP RACH PROCEDURE IN A WIRELESS NETWORK

(71) Applicant: Samsung Electronics Co., Ltd., Suwon-si (KR)

(72) Inventors: Shanthossh Nagarajan, Bangalore (IN); Rishav Agarwal, Bangalore (IN); Shreyas Sreenivas, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 423 days.

(21) Appl. No.: 17/667,892

(22) Filed: Feb. 9, 2022

(65) Prior Publication Data

US 2022/0272763 A1 Aug. 25, 2022

Related U.S. Application Data

(63) Continuation of application No. PCT/KR2022/001983, filed on Feb. 9, 2022.

(30) Foreign Application Priority Data

Feb. 10, 2021 (IN) .............................. 202141005696
Feb. 3, 2022 (IN) .............................. 2021 41005696

(51) Int. Cl.
*H04W 74/0833* (2024.01)
(52) U.S. Cl.
CPC .............................. *H04W 74/0833* (2013.01)
(58) Field of Classification Search
None
See application file for complete search history.

(56) References Cited

U.S. PATENT DOCUMENTS

| 2018/0110074 A1 | 4/2018 | Akkarakaran et al. |
| 2020/0100299 A1 | 3/2020 | Loehr et al. |

(Continued)

FOREIGN PATENT DOCUMENTS

| KR | 10-2020-0083928 A | 7/2020 |
| WO | 2020/034319 A1 | 2/2020 |

(Continued)

OTHER PUBLICATIONS

International Search Report with Written Opinion dated May 9, 2022; International Appln. No. PCT/KR2022/001983.

(Continued)

*Primary Examiner* — Angela Nguyen
(74) *Attorney, Agent, or Firm* — Jefferson IP Law, LLP (57) ABSTRACT

A method for random access channel (RACH) procedure in a wireless network by a user equipment (UE) is provided. The method includes determining a plurality of signal condition parameters associated with the UE. Further, the method includes determining whether at least one signal condition parameter of the plurality of signal condition parameters meets at least one signal condition threshold from a plurality of signal condition thresholds. Further, the method includes triggering one of a 2-step RACH procedure in response to determining that the at least one signal condition parameter of the plurality of signal condition parameters meets the at least one signal condition threshold, or a 4-step RACH procedure in response to determining that the at least one signal condition parameter of the plurality of signal condition parameters does not meet the at least one signal condition threshold.

12 Claims, 9 Drawing Sheets

(56) References Cited

U.S. PATENT DOCUMENTS

| | | |
|---|---|---|
| 2020/0252896 A1 | 8/2020 | Lei et al. |
| 2020/0252967 A1 | 8/2020 | Ozturk et al. |
| 2020/0305202 A1 | 9/2020 | Zhang et al. |
| 2020/0314913 A1 | 10/2020 | Rastegardoost et al. |
| 2022/0116999 A1 | 4/2022 | Xiong et al. |
| 2022/0287107 A1 | 9/2022 | Kim et al. |
| 2023/0171810 A1* | 6/2023 | Belleschi .......... H04W 74/0833 370/329 |
| 2024/0032105 A1* | 1/2024 | Xu ..................... H04W 74/006 |
| 2024/0064816 A1* | 2/2024 | Jiang ................ H04W 74/0836 |

FOREIGN PATENT DOCUMENTS

| | | |
|---|---|---|
| WO | 2020/139053 A1 | 7/2020 |
| WO | 2020/190484 A1 | 9/2020 |
| WO | 2021/006588 A1 | 1/2021 |

OTHER PUBLICATIONS

Indian Office Action dated Sep. 30, 2022; Indian Appln. No. 202141005696.

* cited by examiner

METHOD AND UE FOR CONTROLLING 2-STEP AND 4-STEP RACH PROCEDURE IN A WIRELESS NETWORK

CROSS-REFERENCE TO RELATED APPLICATION(S)

This application is a continuation application, claiming priority under § 365(c), of an International application No. PCT/KR2022/001983, filed on Feb. 9, 2022, which is based on and claims the benefit of an Indian Provisional patent application number 202141005696, filed on Feb. 10, 2021, in the Indian Intellectual Property Office, and of an Indian Complete patent application number 202141005696, filed on Feb. 3, 2022, in the Indian Intellectual Property Office, the disclosure of each of which is incorporated by reference herein in its entirety.

FIELD OF INVENTION

The disclosure relates to a wireless network. More particularly, the disclosure relates to a method and a user equipment (UE) for controlling a 2-step random access channel (RACH) procedure and a 4-step RACH procedure in the wireless network.

BACKGROUND

In general, a random access procedure on long term evolution (LTE) as well as new radio (NR) up to release 15 is a 4-step process.

Figure 1A:
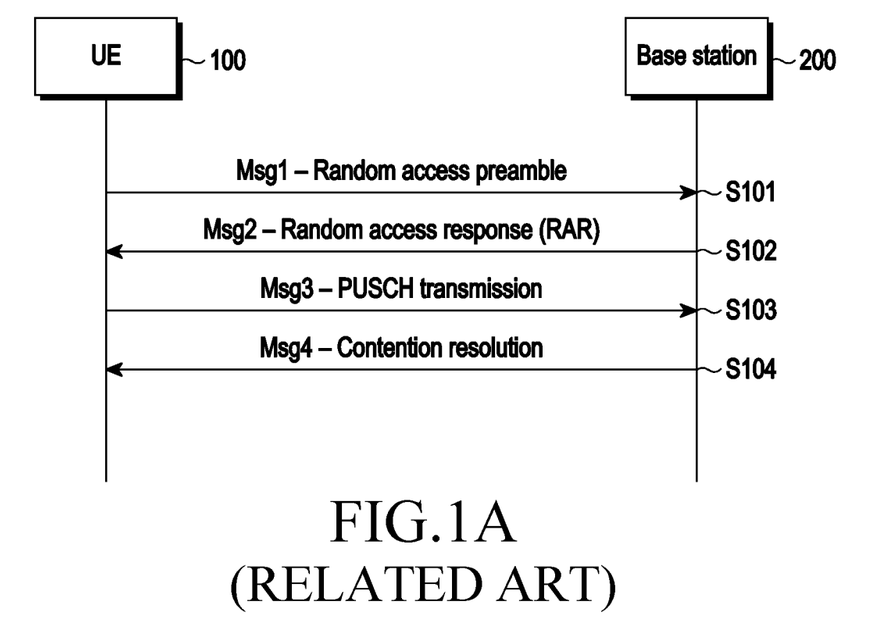
FIG. 1A illustrates a 4-step random access channel (RACH) procedure, according to the related art.

FIG. 1A illustrates a 4-step RACH procedure, according to the related art. With 4-step contention based random access (CBRA) procedure, after transmitting physical random access procedure (PRACH) preamble (Msg1) in operation S101, a user equipment (UE) (100) should wait for an RA response (Msg2) from the network (e.g., base station (200)) in operation S102 and then transmit PUSCH (Msg3) to the network in operation S103. After receiving Msg3, the network resolves the contention in Msg4 in operation S104. In order to reduce the RACH latency, a 3rd generation partnership project (3GPP) release 16 has a RACH enhancement for 2-step RACH avoiding 2 steps/merging two steps.

Figure 1B:
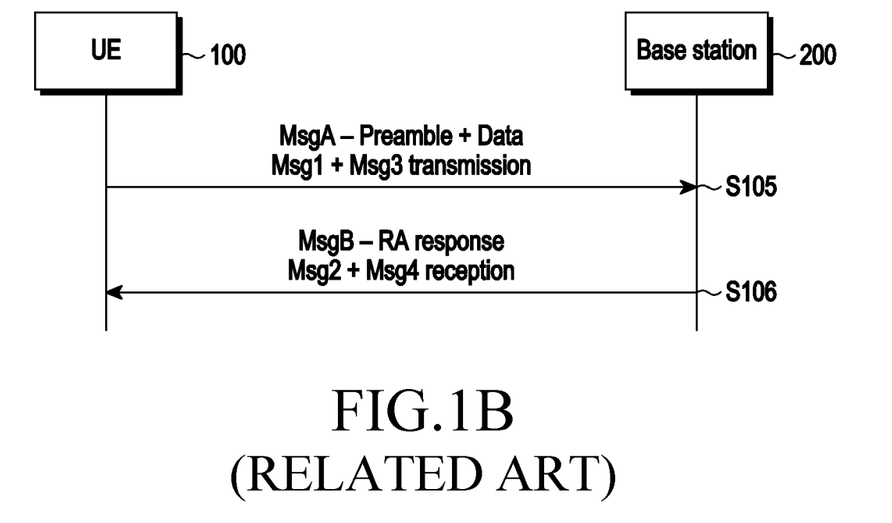
FIG. 1B illustrates a 2-step RACH procedure, according to the related art.

FIG. 1B illustrates a 2-step RACH procedure, according to the related art. With the 2-step CBRA procedure, a PRACH (Msg1) and PUSCH (Msg3) are transmitted together and is named as Msg 'A' in operation S105. RAR (Msg2) and contention resolution (Msg4) transmitted together and is named as Msg 'B' in operation S106. 2-step RA type not only reduces the latency involved in the overall RA procedure but also reduces the control signaling overhead. Though this is controlled by specification, there are few UE solutions possible to give a better user experience. The control of when to use 2-step and when to use 4-step RACH lies completely with the UE.

The above information is presented as background information only to assist with an understanding of the disclosure. No determination has been made, and no assertion is made, as to whether any of the above might be applicable as prior art with regard to the disclosure.

OBJECT OF INVENTION

Aspects of the disclosure are to address at least the above-mentioned problems and/or disadvantages and to provide at least the advantages described below. Accordingly, an aspect of the disclosure is to provide a method and a user equipment (UE) for controlling a random access channel (RACH) procedure in the wireless network based on various parameters (e.g., channel conditions, transmission power of the UE, wireless fidelity (Wi-Fi) Interworking, target cell conditions in case of a handover and type of service active on different subscriber identity modules (SIMs) in a dual SIM dual standby (DSDS)/multiple SIM device), so as to reduce the signaling message between the UE and a base station and provide a better user experience.

Another aspect of the disclosure is to control the 2-step RACH procedure and the 4-step RACH procedure in the wireless network without any additional changes in the base station and reduce latency of RACH procedures.

Additional aspects will be set forth in part in the description which follows and, in part, will be apparent from the description, or may be learned by practice of the presented embodiments.

SUMMARY

In accordance with an aspect of the disclosure, a method for controlling a random access channel (RACH) procedure in a wireless network is provided. The method includes determining, by a user equipment (UE), a plurality of signal condition parameters associated with the UE. Further, the method includes determining whether at least one signal condition parameter of the plurality of signal condition parameters meets at least one signal condition threshold from a plurality of signal condition thresholds. Further, the method includes triggering, by the UE, one of: the 2-step RACH procedure in response to determining that the at least one signal condition parameter of the plurality of signal condition parameters meets the at least one signal condition threshold, or the 4-step RACH procedure in response to determining that the at least one signal condition parameter of the plurality of signal condition parameters does not meet the at least one signal condition threshold.

In an embodiment, the plurality of signal condition parameters includes at least one of a reference signal received power (RSRP) of the UE configured by standard and a reference signal received quality (RSRQ) of the UE, a RSRP of the UE and a signal to interference and noise ratio (SINR) of the UE, a RSRP of the UE and a calculated pathloss at the UE, a RSRP of the UE and a channel quality index (CQI) of the UE, a RSRP of the UE and a block error rate (BLER) of the UE, a RSRQ of the UE, a SINR of the UE, a pathloss, a CQI estimated in a radio resource control (RRC) connected mode of the UE, a physical layer (L1) or layer 2 (L2) down link (DL) or uplink (UL) BLER of the UE, a transmission (Tx) Power of the UE, a type of service, a Transceiver resource manager module (TRM) switch requirement, and a wireless fidelity (WiFi) connectivity status of the UE.

In an embodiment, the determining of the plurality of signal condition parameters associated with the UE includes determining, by the UE, whether a RSRP of the UE meets a RSRP threshold, and determining the plurality of signal condition parameters associated with the UE in response to determining that the RSRP of the UE meets the RSRP threshold.

In an embodiment, each signal condition of the plurality of signal condition thresholds is locally defined at the UE, wherein the plurality of signal condition thresholds includes at least one of a RSRP threshold remotely configured by a base station at the UE and a RSRQ threshold locally configured by the UE, a RSRP threshold remotely configured by a base station at the UE and a SINR threshold locally configured by the UE, a RSRP threshold remotely configured by a base station at the UE and a pathloss threshold locally configured by the UE, a RSRP threshold remotely configured by a base station at the UE and a CQI threshold locally configured by the UE, a RSRP threshold remotely configured by a base station at the UE and a BLER threshold locally configured by the UE, a RSRQ threshold locally configured by the UE, a SINR threshold locally configured by the UE, a pathloss threshold locally configured by the UE, a CQI threshold locally configured by the UE, wherein the CQI is estimated in a RRC connected mode of the UE, a physical layer (L1) or layer 2 (L2) down link (DL) or Uplink (UL) BLER threshold locally configured by the UE, a transmission (Tx) Power threshold locally configured by the UE or at maximum transmit power limit (MTPL), a type of service is one of call service, data service, or a critical and delay intolerant service, and a TRM switch is needed for a high priority task on another subscriber identity module (SIM) stack of the UE or the TRM switch is needed while a priority task is ongoing on a current SIM stack of the UE.

In an embodiment, the method includes detecting, by the UE, whether the RACH procedure is triggered on a leg where 2-step RACH is configured on either a master cell group (MCG) or a secondary cell group (SCG), while the UE is in a dual connectivity (DC) mode. Further, the method includes revising, by the UE, dynamic power sharing thresholds to increase MTPL or an actual Tx power limit on the leg where the 2-step RACH is configured, in response to determining that the RACH procedure is triggered on the leg where the 2-step RACH is configured. Further, the method includes maintaining, by the UE, default dynamic power sharing thresholds, in response to determining that the RACH procedure is not triggered on the leg where the 2-step RACH is configured.

In an embodiment, the method includes detecting, by the UE, that the triggered 2-step RACH procedure has failed and triggering, by the UE, the 4-step RACH procedure.

In accordance with another aspect of the disclosure, a UE for controlling a RACH procedure in a wireless network is provided. The UE includes a RACH procedure controller connected to a memory and a processor. The RACH procedure controller is configured to determine a plurality of signal condition parameters associated with the UE. The RACH procedure controller is configured to determine whether at least one signal condition parameter of the plurality of signal condition parameters meets at least one signal condition threshold from a plurality of signal condition thresholds. The RACH procedure controller is configured to trigger, by the UE, one of the 2-step RACH procedure in response to determining that the at least one signal condition parameter of the plurality of signal condition parameters meets the at least one signal condition threshold, or the 4-step RACH procedure in response to determining that the at least one signal condition parameter of the plurality of signal condition parameters does not meets the at least one signal condition threshold.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF FIGURES

The embodiments are illustrated in the accompanying drawings, throughout which like reference letters indicate corresponding parts in the various figures. The embodiments herein will be better understood from the following description with reference to the drawings, in which.

Throughout the drawings, it should be noted that like reference numbers are used to depict the same or similar elements, features, and structures.

DETAILED DESCRIPTION OF INVENTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiment herein is to provide a method for controlling 2-step RACH procedure and 4-step RACH procedure in a wireless network. The method includes determining a plurality of signal condition parameters associated with the UE. Further, the method includes determining whether at least one signal condition parameter of the plurality of signal condition parameters meets at least one signal condition threshold from a plurality of signal condition thresholds. Further, the method includes triggering, by the UE, one of: the 2-step RACH procedure in response to determining that the at least one signal condition parameter of the plurality of signal condition parameters meets the signal condition threshold, and the 4-step RACH procedure in response to determining that the at least one signal condition parameter of the plurality of signal condition parameters does not meet the signal condition threshold.

Unlike conventional methods and systems, the proposed method can be used to control the 2-step RACH procedure and the 4-step RACH procedure in the wireless network based on channel conditions, transmission power of the UE, Wi-fi Interworking, the target cell conditions in case of a handover and type of service active on different SIMs in a DSDS/multiple SIM device, so as to reduce the signaling message between the UE and a base station and provide a better user experience.

The method can be used to control the 2-step RACH procedure and the 4-step RACH procedure in the wireless network without any additional changes in base station and reduce latency of RACH procedures.

Referring now to the drawings and more particularly to FIGS. 2 through 10, where similar reference characters denote corresponding features consistently throughout the figures, there are shown preferred embodiments.

Figure 2:
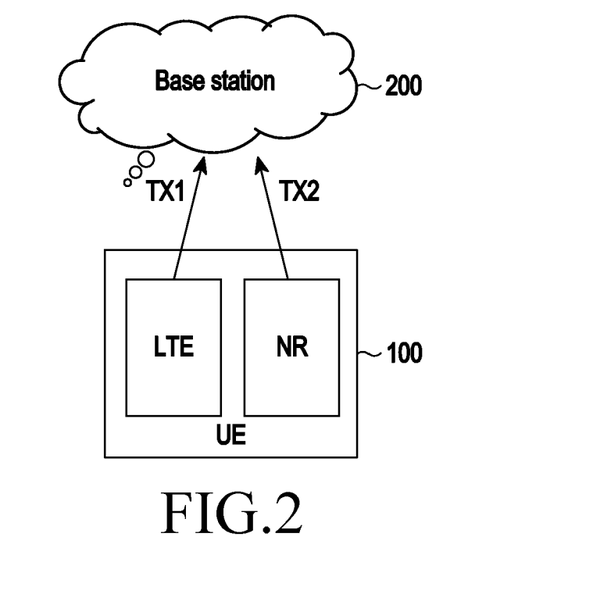
FIG. 2 is an example illustration in which a wireless network controls a 2-step RACH procedure and a 4-step RACH procedure, according to an embodiment of the disclosure.

FIG. 2 is an example illustration in which a wireless network (1000) controls a 2-step RACH procedure and a 4-step RACH procedure, according to an embodiment of the disclosure.

Referring to FIG. 2, in an embodiment, the wireless network (1000) includes a UE (100) and a base station (200). The UE (100) is communicated with the base station (200) over a wireless medium or a wired medium. The wireless network (1000) can be, for example, but not limited to a 5th generation (5G) network, a 6G network and an O-RAN network. The UE (100) can be, for example, but not limited to a laptop, a desktop computer, a notebook, a relay device, a device-to-device (D2D) device, a vehicle to everything (V2X) device, a smartphone, a tablet, an immersive device, and an internet of things (IoT) device. The base station (200) may also include or be referred to by those skilled in the art as a base station, a base transceiver station, a radio base station, an access point, a radio transceiver, an eNB, a gNodeB (GNB), a 5G eNB, or the like.

The UE (100) is configured to determine whether a RSRP of the UE (100) meets a RSRP threshold and determine the plurality of signal condition parameters associated with the UE (100), in response to determining that the RSRP of the UE (100) meets the RSRP threshold. Based on the determination, the UE (100) is configured to determine whether a signal condition parameter of the plurality of signal condition parameters meets a signal condition threshold from a plurality of signal condition thresholds.

The plurality of signal condition parameters can be, for example, but not limited to a RSRP of the UE (100) configured by standard and a RSRQ of the UE (100), a RSRP of the UE (100) and a SINR of the UE (100), a RSRP of the UE (100) and a pathloss at the UE (100), a RSRP of the UE (100) and a CQI of the UE (100), a RSRP of the UE (100) and a BLER of the UE (100), a RSRQ of the UE (100), a SINR of the UE (100), a pathloss of the UE (100), a CQI estimated in a RRC connected mode of the UE (100), a physical layer (L1) or layer 2 (L2) DL or UL BLER of the UE (100), a Tx Power of the UE (100), a type of service, a TRM switch requirement, and a wireless fidelity (WiFi) connectivity status of the UE (100).

Each signal condition of the signal condition threshold is locally defined at the UE (100). The plurality of signal condition thresholds can be, for example, but not limited to a RSRP threshold remotely configured by the base station (200) at the UE (100) and a RSRQ threshold locally configured by the UE (100), a RSRP threshold remotely configured by the base station (200) at the UE (100) and a SINR threshold locally configured by the UE (100), a RSRP threshold remotely configured by the base station (200) at the UE (100) and a pathloss threshold locally configured by the UE (100), a RSRP threshold remotely configured by the base station (200) at the UE (100) and a CQI threshold locally configured by the UE (100), a RSRP threshold remotely configured by a base station (200) at the UE (100) and a BLER threshold locally configured by the UE (100), a RSRQ threshold locally configured by the UE (100), a SINR threshold locally configured by the UE (100), a pathloss threshold locally configured by the UE (100), a CQI threshold locally configured by the UE (100), where the CQI is estimated in a RRC connected mode of the UE (100), a layer 1 or layer 2 DL or UL BLER threshold locally configured by the UE (100), a Tx power threshold locally configured by the UE (100) or at MTPL, a type of service is one of call service, data service, or a critical and delay intolerant service, and a TRM switch is needed for a high priority task on another SIM stack of the UE (100) or the TRM switch is needed while a priority task is ongoing on a current SIM stack of the UE (100).

In response to determining that the signal condition parameter of the plurality of signal condition parameters meets the signal condition threshold, the UE (100) is configured to trigger the 2-step RACH procedure. In response to determining that the signal condition parameter of the plurality of signal condition parameters does not meet the signal condition threshold, the UE (100) is configured to trigger the 4-step RACH procedure.

Further, the UE (100) is configured to detect whether the RACH procedure is triggered on a leg where 2-step RACH is configured on either a MCG or a SCG, while the UE (100) is in a dual connectivity (DC) mode. In response to determining that the RACH procedure is triggered on the leg where 2-step RACH is configured, the UE (100) is configured to revise dynamic power sharing thresholds to increase MTPL or an actual Tx power limit on the leg where 2-step RACH is configured. In response to determining that the RACH procedure is not triggered on the leg where 2-step RACH is configured, the UE (100) is configured to maintain default dynamic power sharing thresholds.

In an example, in EUTRA-NR DC (ENDC), if a VOLTE is ongoing the net power available for the NR leg gets capped at an MTPL lower than the expected normal, so that if the RACH has to be done on the other leg where available transmission power is lower, it becomes a conundrum to ensure that 2-step RACH succeeds due to its higher packet size of Msg 'A'.

Conventional methods are decided based on 4-STEP RACH processes. Power sharing is a UE mechanism and herein, the proposed method claim to revise the power distribution and sharing between the 2 legs of DC (ENDC/NRDC/MRDC) in case 2-step RACH is being configured compliant to 3GPP's R16 items.

Current configurations are not designed to handle high power requirements of 2-step RACH and RACH failures will happen in mid and cell edge conditions if power distribution is not revised. Especially during services like VOLTE when transmit power available for the other leg in DC mode reduces, 2-STEP RACH failures rate might even increase. Hence, the proposed method proposes to implement a proper distribution of TX powers between systems that use 2-step RACH.

In below condition, when dynamic power sharing (DPS) operation is used by the UE (100), while using 2-step and 4-step RACH.
1. Transmission power adjustments during VoLTE call+ 2-step RACH,
2. Max retransmissions of scheduling request, and/or
3. RACH triggered after max transmissions of scheduling request (sr-maxRetx).

Further, the UE (100) is configured to detect that the triggered 2-step RACH procedure has failed and trigger the 4-step RACH procedure based on the detection.

Based on the proposed method, no new trigger is defined for 2-step RA type in Release-16. All triggers for 4-step RA type are considered valid for 2-step RA type too. The proposed method is applicable for RRC INACTIVE, RRC_CONNECTED and RRC_IDLE states of the UE (100). Msg 'A' transmission is a PRACH preamble and PUSCH carrying payload is transmitted in time division multiplexing (TDM) fashion. The base station (200) is to provide resources of PUSCH (MsgA) in radio resource control (RRC) configuration beforehand. MsgA-PUSCH contents in 2-step RA are same as Msg3 contents of 4-step RA type. MsgB contents are similar to that of combined Msg2 and Msg4 contents of 4-step RA type. New RNTI in release-16 for MsgB reception—MsgB-RNTI.

Figure 3:
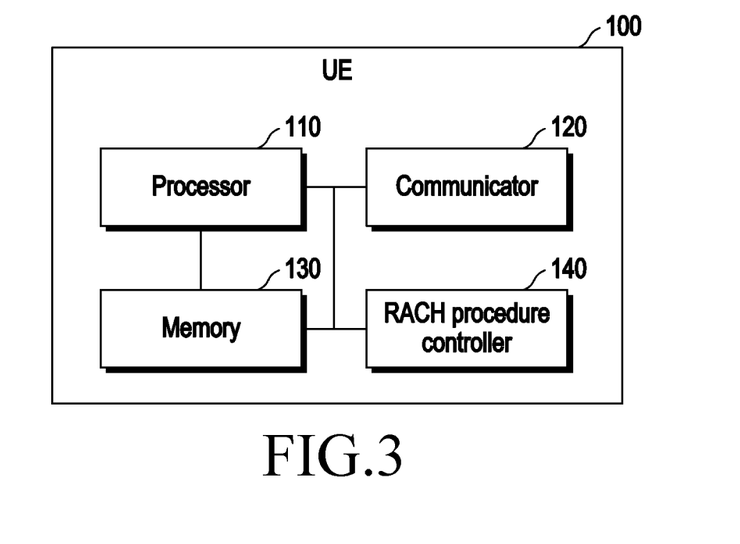
FIG. 3 shows various hardware components of a user equipment (UE), according to an embodiment of the disclosure.

FIG. 3 shows various hardware components of the UE (100), according to an embodiment of the disclosure.

Referring to FIG. 3, in an embodiment, the UE (100) includes a processor (110), a communicator (120), a memory (130), and a RACH procedure controller (140). The processor (110) is coupled with the communicator (120), the memory (130) and the RACH procedure controller (140).

The RACH procedure controller (140) is configured to determine whether the RSRP of the UE (100) meets the RSRP threshold and determine the plurality of signal condition parameters associated with the UE (100), in response to determining that the RSRP of the UE (100) meets the RSRP threshold. Based on the determination, the RACH procedure controller (140) is configured to determine whether the signal condition parameter of the plurality of signal condition parameters meets the signal condition threshold from the plurality of signal condition thresholds.

In response to determining that the signal condition parameter of the plurality of signal condition parameters meets the signal condition threshold, the RACH procedure controller (140) is configured to trigger the 2-step RACH procedure. In response to determining that the signal condition parameter of the plurality of signal condition parameters does not meet the signal condition threshold, the RACH procedure controller (140) is configured to trigger the 4-step RACH procedure.

Further, the RACH procedure controller (140) is configured to detect whether the RACH procedure is triggered on the leg where 2-step RACH is configured on either the MCG or the SCG, while the UE (100) is in the DC mode. In response to determining that the RACH procedure is triggered on the leg where 2-step RACH is configured, the RACH procedure controller (140) is configured to revise the dynamic power sharing thresholds to increase MTPL or an actual Tx power limit on the leg where 2-step RACH is configured. In response to determining that the RACH procedure is not triggered on the leg where 2-step RACH is configured, the RACH procedure controller (140) is configured to maintain the default dynamic power sharing thresholds.

Further, the RACH procedure controller (140) is configured to detect that the triggered 2-step RACH procedure has failed and trigger the 4-step RACH procedure based on the detection.

The RACH procedure controller (140) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in random access memory (RAM) or cache).

Although the FIG. 3 shows various hardware components of the UE (100) but it is to be understood that other embodiments are not limited thereon. In other embodiments, the UE (100) may include a lesser or greater number of components. Further, the labels or names of the components are used only for illustrative purpose and does not limit the scope of the disclosure. One or more components can be combined together to perform same or substantially similar function in the UE (100).

Figure 4:
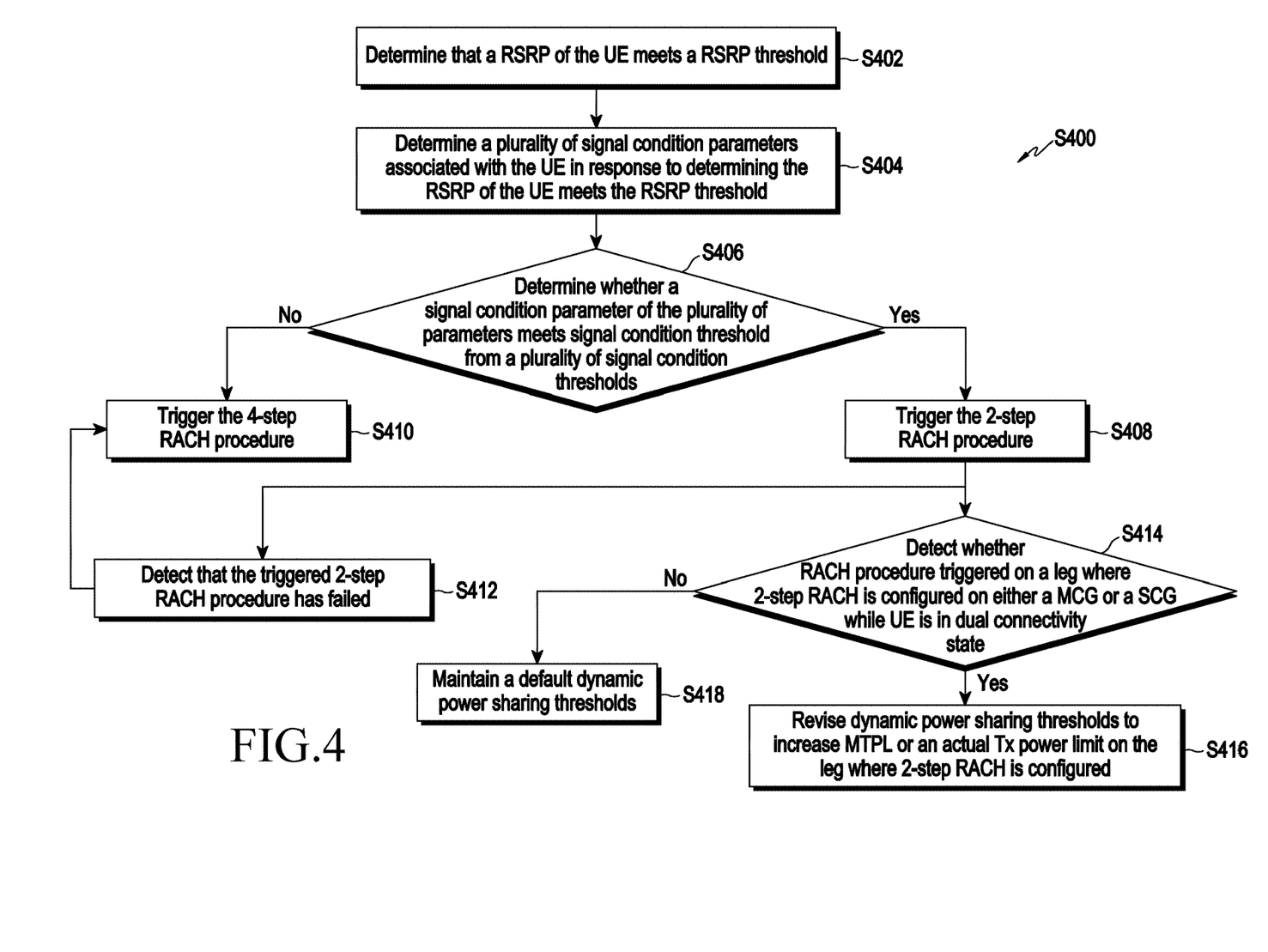
FIG. 4 is a flow chart illustrating a method for controlling the 2-step RACH procedure and the 4-step RACH procedure in the wireless network, according to an embodiment of the disclosure.

FIG. 4 is a flow chart (S400) illustrating a method for controlling the 2-step RACH procedure and the 4-step RACH procedure in the wireless network (1000), according to an embodiment of the disclosure. The operations (S402-S418) are performed by the RACH procedure controller (140).

Referring to FIG. 4, at operation S402, the method includes determining that the RSRP of the UE (100) meets the RSRP threshold. At operation S404, the method includes determining the plurality of signal condition parameters associated with the UE (100), in response to determining that the RSRP of the UE (100) meets the RSRP threshold. At operation S406, the method includes determining whether the signal condition parameter of the plurality of signal condition parameters meets the signal condition threshold from the plurality of signal condition thresholds. In response to determining that the signal condition parameter of the plurality of signal condition parameters meets the signal condition threshold from the plurality of signal condition thresholds, at operation S408, the method includes triggering the 2-step RACH procedure.

In response to determining that the signal condition parameter of the plurality of signal condition parameters does not meet the signal condition threshold from the plurality of signal condition thresholds, at operation S410, the method includes triggering the 4-step RACH procedure. At operation S412, the method includes detecting that the triggered 2-step RACH procedure has failed. Based on the detection, at operation S410, the method includes triggering the 4-step RACH procedure.

At operation S414, the method includes detecting whether the RACH procedure is triggered on the leg where 2-step RACH is configured on either the MCG or the SCG, while the UE (100) is in the DC mode. In response to determining that the RACH procedure is triggered on the leg where 2-step RACH is configured, at operation S416, the method includes revising the dynamic power sharing thresholds to increase MTPL or the actual Tx power limit on the leg where the 2-step RACH is configured. In response to determining that the RACH procedure is not triggered on the leg where 2-step RACH is configured, at operation S418, the method includes maintaining the default dynamic power sharing thresholds.

The proposed method can be used to control the 2-step RACH procedure and the 4-step RACH procedure in the wireless network (1000) based on channel conditions, transmission power of the UE, Wi-fi Interworking, the target cell conditions in case of a handover and type of service active on different SIMs in a DSDS/multiple SIM device, so as to reduce the signaling message between the UE (100) and the base station (200) and provide a better user experience. The method can be used to control the 2-step RACH procedure and the 4-step RACH procedure in the wireless network (1000) without any additional changes in the base station (200) and reduce latency of RACH procedures.

Figure 5:
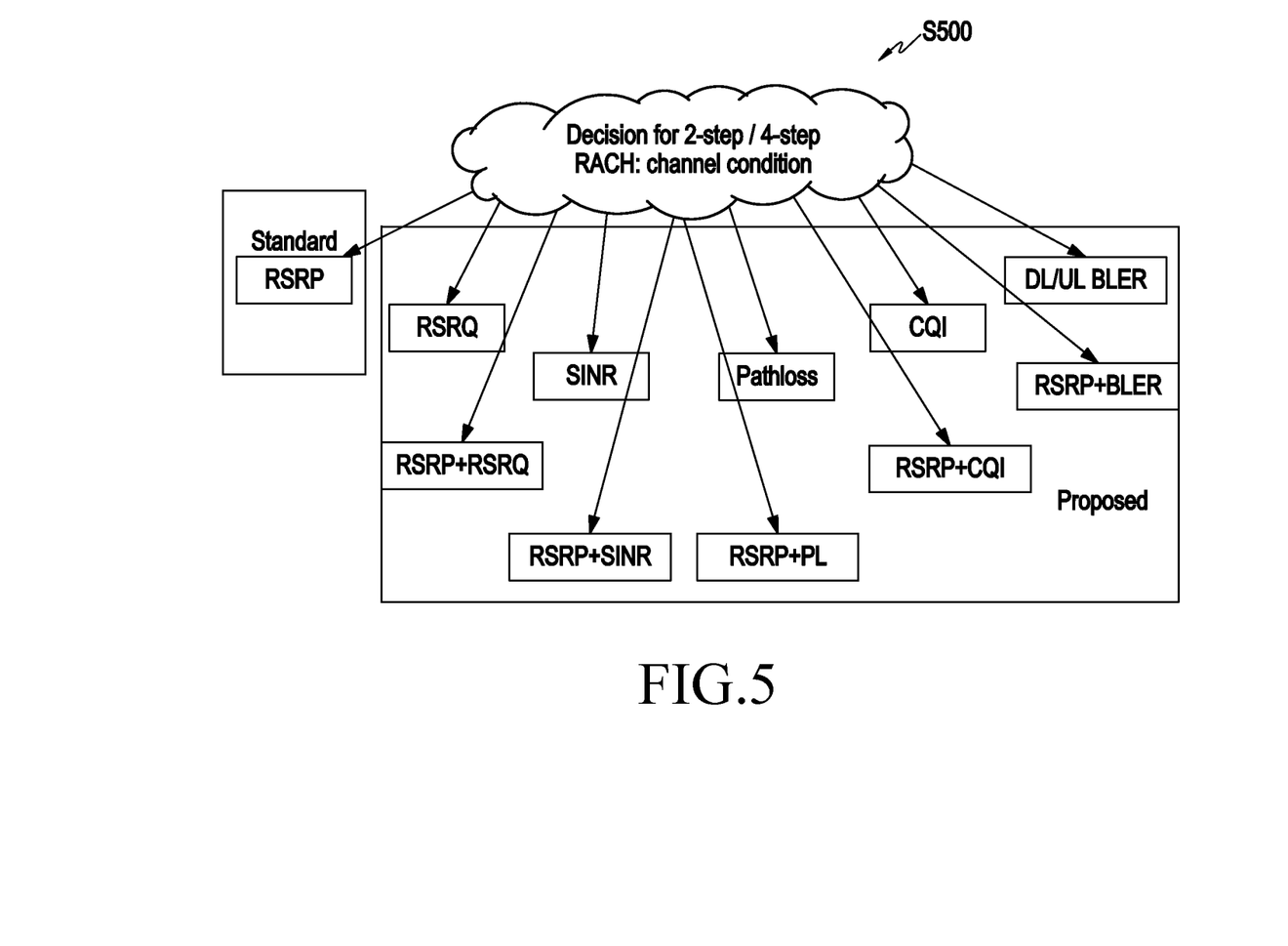
FIG. 5 illustrates an example scenario for using the 2-step and the 4-step RACH channel condition, according to an embodiment of the disclosure.

FIG. 5 illustrates an example scenario (S500) for using the 2-step and the 4-step RACH channel condition, according to the embodiment of the disclosure.

Referring to the FIG. 5 consider a proposed method, standards define threshold RSRP value to use 2-step RACH. But in live network, the RSRP is not the only criteria that could affect the channel condition. A reference signal received quality (RSRQ) interference could play a major role which is caused by interference from neighboring cells/neighboring devices. A signal to noise ratio (SNR) is another major factor, which is decided based on multiple factors. Path loss which is calculated based on block power configuration is a deciding factor for determining the uplink characteristics.

The UE (100) shall decide when to use 2-step and 4-step RACH based on following parameters:
1. RSRP (configured by standard)+RSRQ,
2. RSRP+SINR,
3. RSRP+Path loss,
4. Only RSRQ,
5. Only SINR,
6. Only path loss,
7. CQI estimated in RRC connected mode,
8. Layer 1/Layer 2 DL/UL BLER, and/or
9. Two/more combinations of the above.

Figure 6:
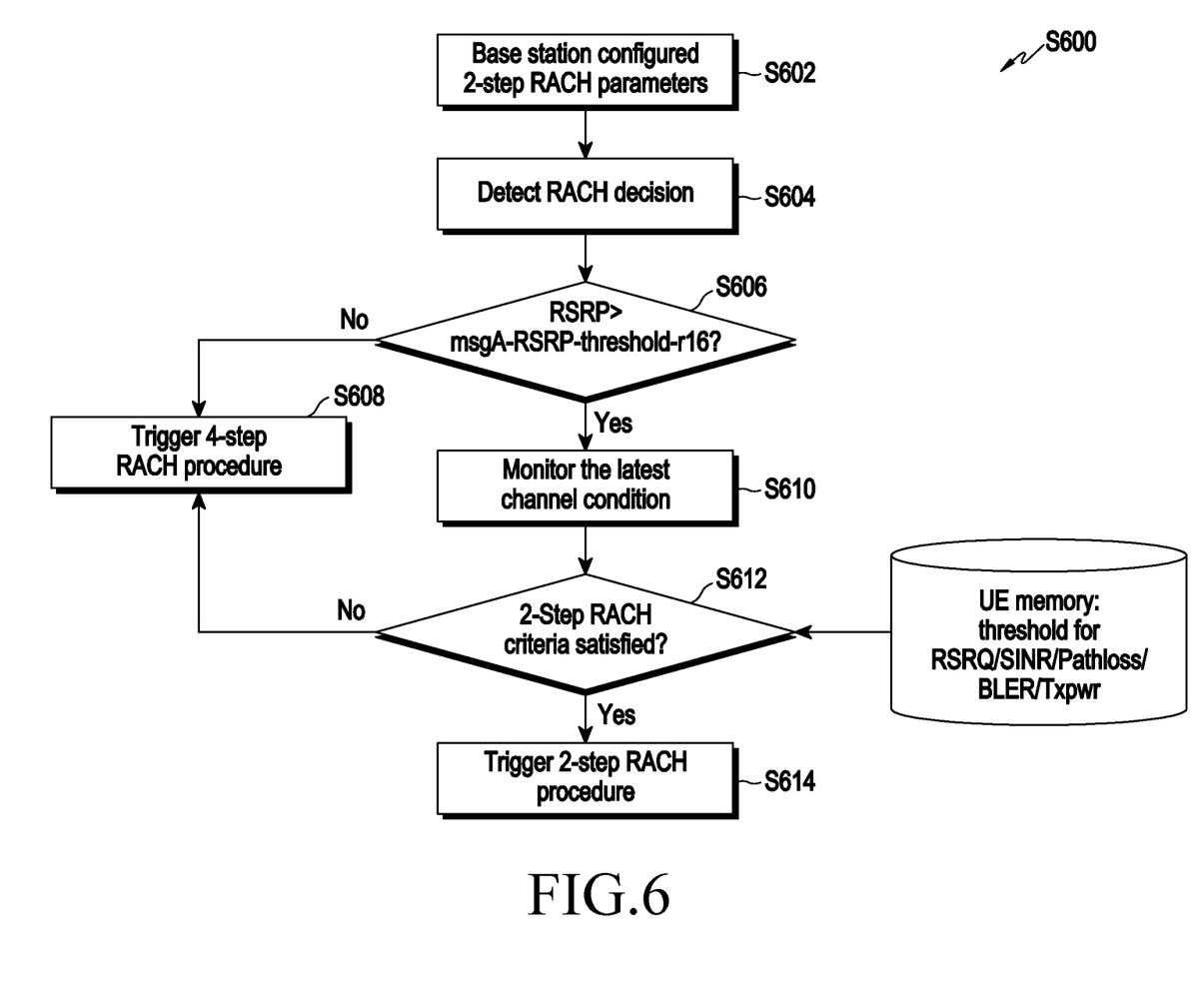
FIG. 6 is an example flow chart illustrating a method for controlling the 2-step RACH procedure and the 4-step RACH procedure in the wireless network, according to an embodiment of the disclosure.

FIG. 6 is an example flow chart (S600) illustrating a method for controlling the 2-step RACH procedure and the 4-step RACH procedure in the wireless network (1000), according to an embodiment of the disclosure. The operations (S602-S614) are performed by the RACH procedure controller (140).

Referring to FIG. 6, at operation S602, the base station (200) is configured the 2-step RACH parameter. At operation S604, the UE (100) detects the RACH decision. At operation S606, the UE (100) determines whether the RSRP is greater than msgA-RSRP-threshold-r16. In response to determining that the RSRP is not greater than msgA-RSRP-threshold-r16, at operation S608, the UE (100) triggers the 4-Step RACH procedure. In response to determining that the RSRP is greater than msgA-RSRP-threshold-r16, at operation S610, the UE (100) monitors the latest channel condition (e.g., RSRQ/SINK/pathloss/BLER/Txpwr or the like). At operation S612, the UE (100) determines whether the 2-Step RACH criteria are satisfied. In response to determining that the 2-Step RACH criteria are not satisfied, at operation S608, the UE (100) triggers the 4-Step RACH procedure. In response to determining that the 2-Step RACH criteria are satisfied, at operation S614, the UE (100) triggers the 2-Step RACH procedure.

Figure 7:
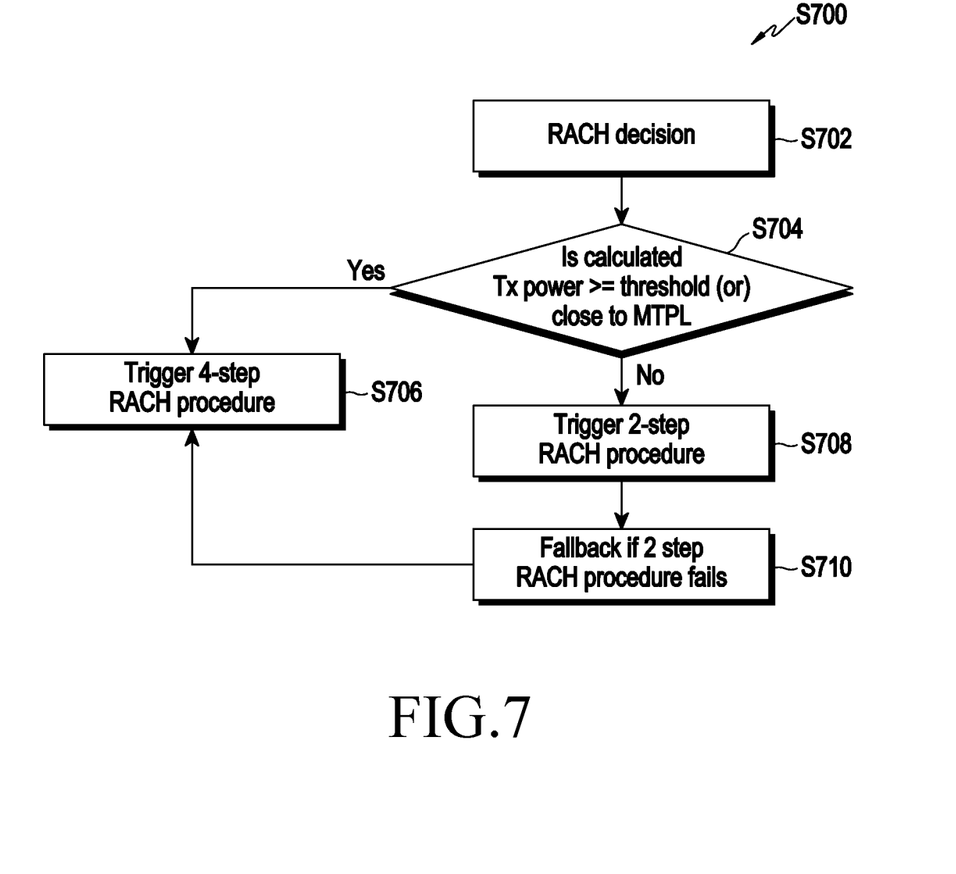
FIG. 7 is an example flow chart illustrating a method for controlling the 2-step RACH procedure and the 4-step RACH procedure in the wireless network during a high Tx power scenario, according to an embodiment of the disclosure.

FIG. 7 is an example flow chart (S700) illustrating a method for controlling the 2-step RACH procedure and the 4-step RACH procedure in the wireless network (1000) during the high Tx power scenario, according to an embodiment of the disclosure. The operations (S702-S710) are performed by the RACH procedure controller (140).

Referring to the FIG. 7, at operation S702, the UE (100) detects the RACH decision. At operation S704, the UE (100) determines whether calculated Tx power is greater than threshold (or) close to the MTPL. In response to determining that calculated Tx power is greater than threshold (or) close to the MTPL, at operation S706, the UE (100) triggers the 4-Step RACH procedure. In response to determines that calculated Tx power is not greater than threshold (or) close to the MTPL, at operation S708, the UE (100) triggers the 2-Step RACH procedure. At operation S710, the UE (100) fallbacks and triggers the 4-Step RACH procedure if the 2 Step RACH procedure has failed.

In other words, due to weak signal condition/retransmissions due to NACKs, the UE (100) might be transmitting in high transmission power. If the UE (100) transmits at a maximum transmit power limit (MTPL) or close to the MTPL, it means the signal is not good enough or UE is facing retransmissions. With the above understanding, it makes sense to stop the UE (100) from doing a 2-step RACH while transmission power is at the MTPL/close to the MTPL. The UE (100) shall have a technique to decide 2-step or 4-step RACH based on the transmission power of the UE (100). If the transmission power (actual/calculated) is very high UE shall always fall back to 4-step legacy RACH.

Figure 8:
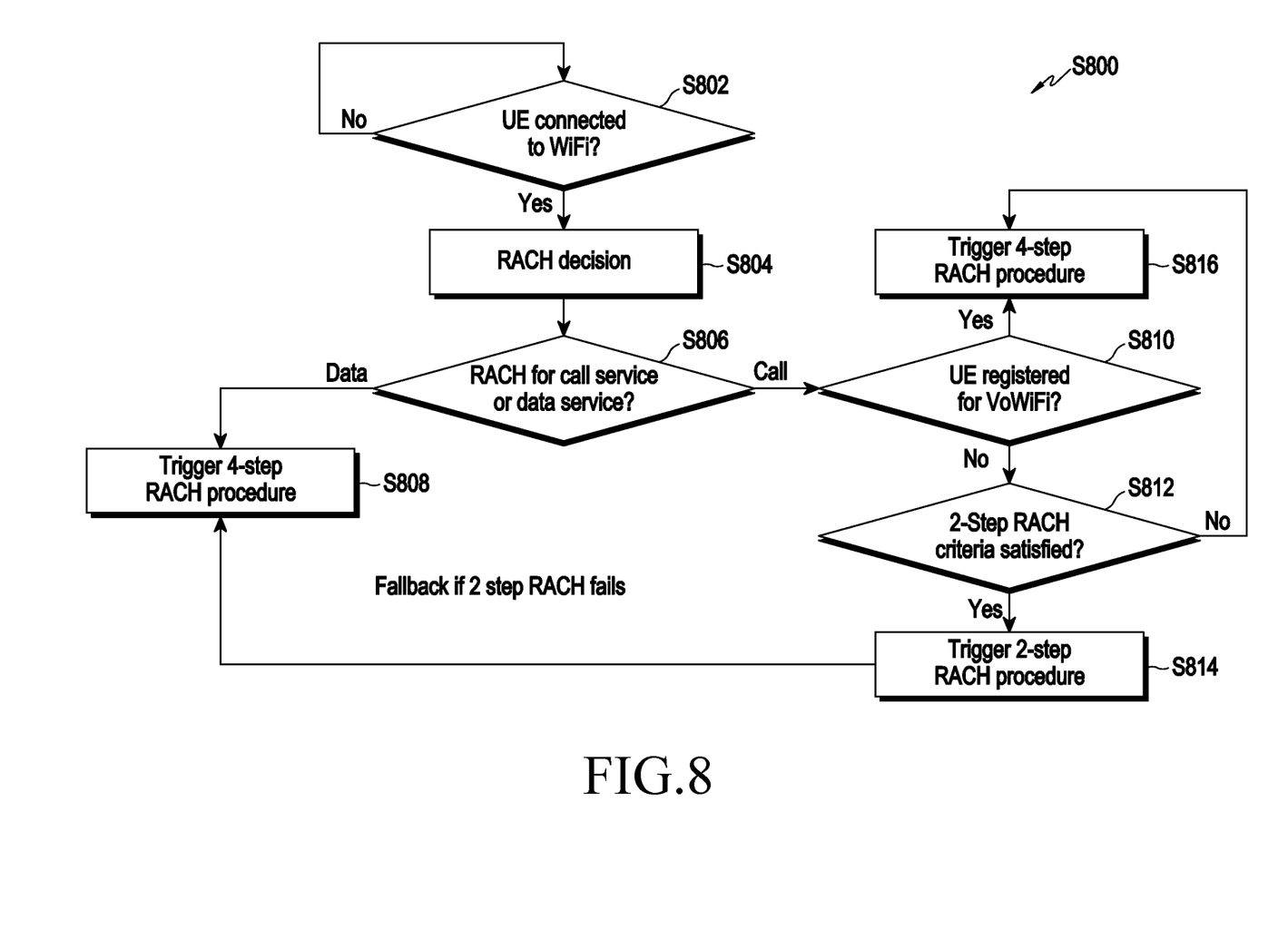
FIG. 8 is an example flow chart illustrating a method for controlling the 2-step RACH procedure and the 4-step RACH procedure in the wireless network during a Wi-Fi interworking scenario, according to an embodiment of the disclosure.

FIG. 8 is an example flow chart (S800) illustrating a method for controlling the 2-step RACH procedure and the 4-step RACH procedure in the wireless network (1000) during a Wi-Fi interworking scenario, according to an embodiment of the disclosure. The operations (S802-S814) are performed by the RACH procedure controller (140).

Referring to the FIG. 8, at operation S802, the UE (100) is connected to the WiFi. At operation S804, the UE (100) detects the RACH decision. At operation S806, the UE (100) determines whether the RACH is for the call service or the data service. In response to determining that the RACH is for the data service then, at operation S808, the UE (100) triggers the 4-Step RACH procedure. In response to determining that the RACH is for the call service then, at operation S810, the UE (100) determines whether the UE (100) is registered for the VoWiFi. In response to determining that the UE (100) is registered for the VoWiFi, at operation S808, the UE (100) triggers the 4-Step RACH procedure. In response to determining that the UE (100) is not registered for the VoWiFi, at operation S812, the UE (100) determines whether the 2-Step RACH criteria are satisfied. In response to determining that the 2-Step RACH criteria are satisfied, at operation S814, the UE (100) triggers the 2-Step RACH procedure. In response to determining that the 2-Step RACH criteria are not satisfied, at operation S816, the UE (100) triggers the 4-Step RACH procedure. Further, the UE (100) triggers the 4-Step RACH procedure, if 2 Step RACH procedure has failed.

In other words, many times the UE (100) may be connected over Wi-Fi for data services. The UE (100) might still have to trigger RACH for uplink signaling/handover/other reasons. Since the UE (100) is already connected over Wi-Fi for data services, using 2-step RACH may not save any latency here as actual critical/non-critical data goes over Wi-Fi. Even if call is in progress (VoLTE/VoNR), the calls might go over Voice Over Wi-Fi (VoWi-Fi). Thus, using 2-step RACH in such scenarios may not save any latency.

If the UE (100) is connected over Wi-Fi for data/call services, the UE (100) shall NOT use 2-Step RACH as no latency is reduced and data can still go over Wi-Fi/VoWi-Fi without delay. If the UE/network doesn't support VoWi-Fi, and RACH trigger is for/during a VoLTE/VoNR call which goes over cellular, the UE shall still decide to use 2-step RACH with conditions as explained above.

Below are the scenarios of when to use 2-step and 4-step RACH during the handover:
1. During handover, in RRC reconfiguration, target cell's RACH parameters are shared to the UE (100).
2. If the UE (100) uses 2-step RACH and during handover (HO) if there is any issue with acquisition due to weak condition of target cell, the UE (100) might face radio link failure (RLF)/other issues which might result in poor user experience/interruption to services.
3. Same parameters as mentioned in channel condition shall be used on target cell also, during handover to estimate whether to use 2-Step RACH or 4-Step RACH.

The UE (100) shall have a method to decide 2-step or 4-step RACH on the target cell during handover. The UE (100) shall use the same parameters as mentioned in channel condition to assess the target cell during handover and if a criterion doesn't satisfy, the UE (100) shall use 4-Step RACH during handover.

Figure 9:
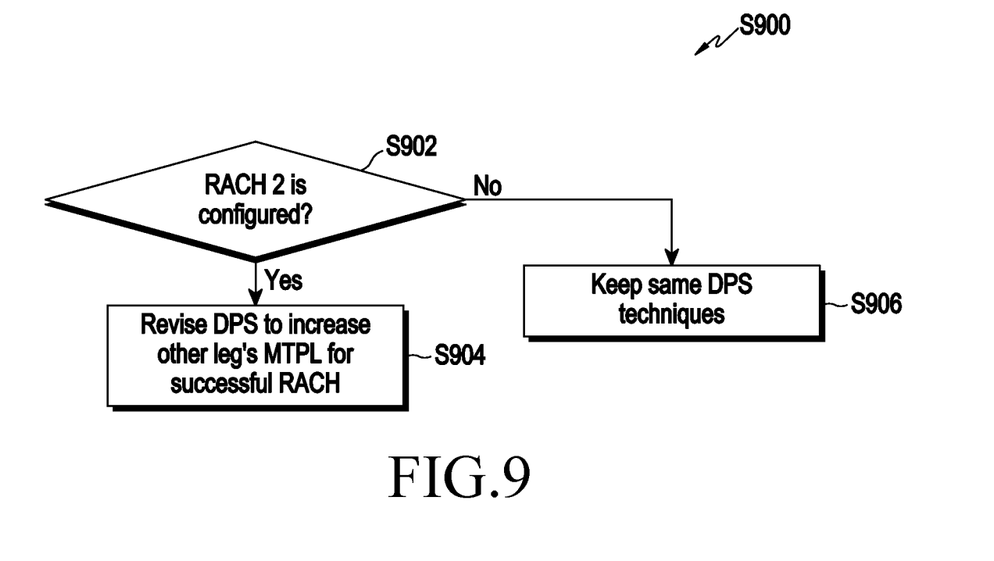
FIG. 9 is an example flow chart illustrating a method for controlling the 2-step RACH procedure and the 4-step RACH procedure in the wireless network based on a type of RACH resources configured by a radio resource control (RRC) and dynamic power sharing while the UE is operating in the dual connectivity (DC) mode, according to an embodiment of the disclosure.

FIG. 9 is an example flow chart (S900) illustrating a method for controlling the 2-step RACH procedure and the 4-step RACH procedure in the wireless network (1000) based on a type of RACH resources configured by the RRC and dynamic power sharing while the UE (100) is operating in the DC mode, according to an embodiment of the disclosure. The operations (S902-S906) are performed by the RACH procedure controller (140).

Referring to the FIG. 9, at operation S902, the UE (100) determines whether the RACH 2 is configured. In response to determining that the RACH 2 is configured, at operation S904, the UE (100) revises the DPS to increase other leg's MTPL for successful RACH. In response to determining that the RACH 2 is not configured then, at operation S906, the UE (100) keeps same DPS techniques.

In other words, based on the type of RACH resources configured by the RRC, the UE (100) will choose the best power distribution techniques and divide the power accordingly. This will ensure that 2-step RACH special power requirements are met and RACH failure rate will reduce in mid and cell edge conditions.

Figure 10:
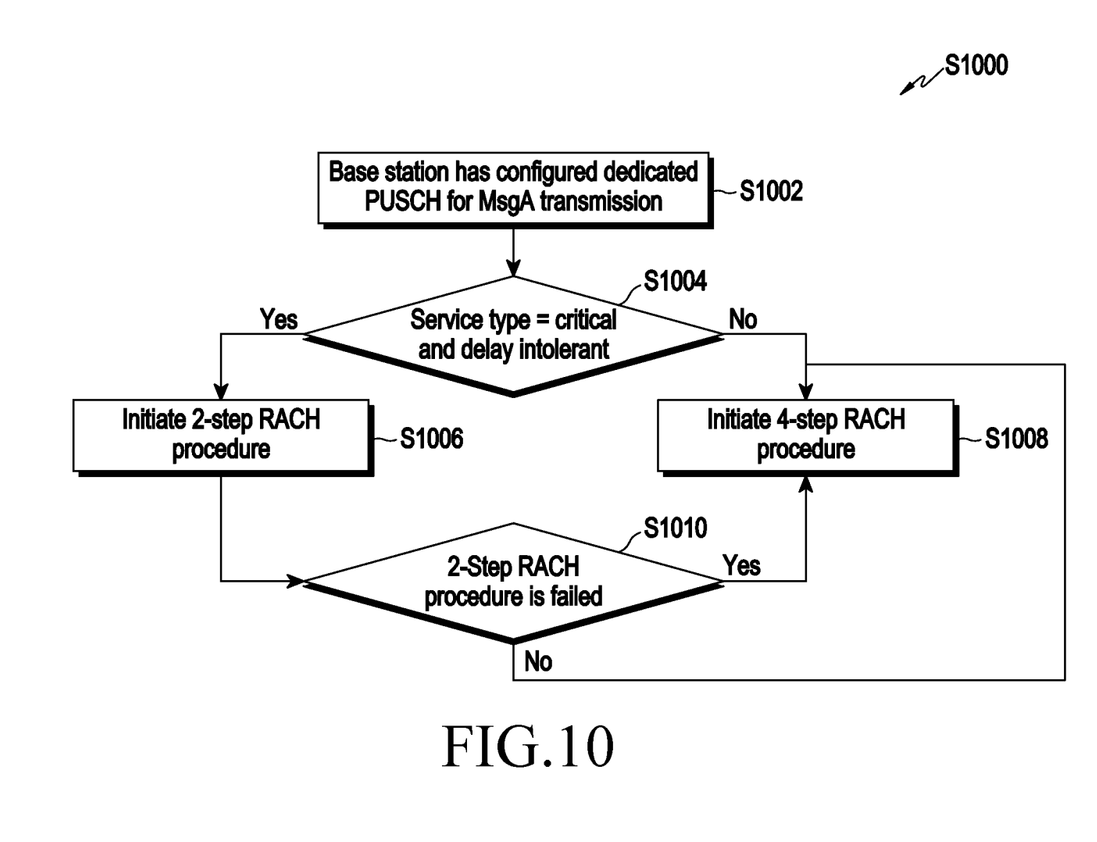
FIG. 10 is an example flow chart illustrating a method for controlling the 2-step RACH procedure and the 4-step RACH procedure in the wireless network based on a RACH triggered after max transmissions of scheduling request (e.g., sr-maxRetx), according to an embodiment of the disclosure.

FIG. 10 is an example flow chart (S1000) illustrating a method for controlling the 2-step RACH procedure and the 4-step RACH procedure in the wireless network (1000) based on the RACH triggered after max transmissions of scheduling request (sr-maxRetx), according to an embodiment of the disclosure. The operations (S1002-S1014) are performed by the RACH procedure controller (140).

Referring to the FIG. 10, at operation S1002, the base station (200) has configured dedicated PUSCH for MsgA transmission. At operation S1004, the UE (100) determines whether the service type is equal to a critical and delay intolerant service. In response to determining that the service type is equal to the critical and delay intolerant service then, at operation S1006, the UE (100) initiates the 2-Step RACH procedure. In response to determining that the service type is not equal to critical and delay intolerant service then, at operation S1008, the UE (100) initiates the 4-Step RACH procedure. At operation S1010, the UE (100) determines that the 2-Step RACH procedure has failed. The UE (100) initiates the 4-Step RACH procedure based on the determination.

Based on the proposed method, below are the conditions for RACH triggered after max transmissions of scheduling request:
1. When the UE (100) has uplink data to transmit but the base station (200) has not allocated any PUSCH resources, the specification defines that the UE (100) will trigger the scheduling request to the base station (200).
2. The SR will be sent to the base station (200) to indicate that the UE (100) is in need of Uplink resources so the base station (200) can allocate UL grants.

3. The UE (100) will try to transmit SR periodically till the counter configured by the base station (200)—sr-maxRetx is reached.
4. Once this counter is expired, the UE (100) will initiate the RACH procedure so that the base station (200) can once again be synchronized with the UE (100) so that the UE (100) can get uplink grants from the base station (200).
5. With the new enhancements, the UE (100) has an option to trigger either a 4 step RACH or a 2 step RACH procedure.

Below are the scenarios when the base station (200) has previously configured dedicated PUSCH resources to be used ONLY for transmission of Msg 'A' in the 2 step RACH procedure.

1. The UE (100) has sent the scheduling request until sr-maxRetx is reached and has not received any Uplink grant from the base station (200).
2. The UE (100) has to initiate RACH. The base station (200) shall take into consideration the type of service which was ongoing prior for which Uplink grant was needed.
3. If the service is of the type which is Delay Intolerant and critical service, the system shall Initiate a 2 Step RACH Procedure using the previously configured dedicated resource for Msg 'A'
4. This is to avoid the overhead of extra signaling exchanges in 4 step RACH procedure. If the 2 step RACH process fails, fall back to 4 step RACH process.
5. If the service is of type which is Non critical and Delay tolerant, the system shall proceed for the 4 step RACH process to ensure reliability.

Below are the scenarios when the option to trigger either a 2 step RACH process or a 4 step RACH process when in dual sim dual standby (DSDS)/multiple SIM scenarios where one or both/all the subscriptions/SIMs are NR capable.

1. The UE (100) which supports DSDS will have an option to switch to either the Sub1/SIM1 or Sub2/SIM2 depending on where the data trigger occurs.
2. Considering the scenario where there is a high priority data session ongoing on the Sub1 and if there is a trigger for a session on Sub2, then Transceiver resource manager module (TRM) switch will be needed. To avoid delay on the Sub1, 2 step RACH procedure shall be employed on Sub2 so that TRM is handed back to Sub1 sooner with minimum interruption. Otherwise 4 step RACH procedures shall be employed.
3. Considering the scenario where there is a low priority data session ongoing on the Sub1 and if there is a trigger for a session on Sub2 with a higher priority data, then TRM switch will be needed. To avoid delay on the Sub2, 2 step RACH procedure shall be employed on Sub2 so that TRM is handed to Sub2 sooner with minimum interruption. Otherwise 4 step RACH procedures shall be employed.
4. The above example provided with 2 subscriptions/SIM cards shall be extended to more than 2/multiple SIM cards supported device also.

The various actions, acts, blocks, steps, or the like in the flow charts (S400, S600-S1000) may be performed in the order presented, in a different order or simultaneously. Further, in some embodiments, some of the actions, acts, blocks, steps, or the like may be omitted, added, modified, skipped, or the like without departing from the scope of the disclosure.

Further, it would be appreciated to note that there are no specific scenarios that should be handled at the gNB or network entity due to the proposed solution. Since the solution is related to taking a decision on whether the 2-step or the 4-step RACH shall be used based on conditions, it does not need any additional changes in the gNB or network entity. A gNB supporting the 2-step RACH shall support all the solution proposed to the UE. Similarly, a gNB that shall not support 2-step RACH procedure shall not configure the UE for 2-step RACH parameters so that the UE shall also fallback to legacy 4-step RACH procedure. A gNB that supports 2-step RACH procedure shall respond to the Msg-A from the UE with a Msg-B as response. A gNB that supports only legacy 4-step RACH procedure shall respond to the Msg1 from the UE with a Msg2 and follow legacy approach of RACH process.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method for controlling a random access channel (RACH) procedure in a wireless network, the method comprising:
   determining, by a user equipment (UE), a plurality of signal condition parameters associated with the UE;
   determining, by the UE, whether at least one signal condition parameter of the plurality of signal condition parameters meets at least one signal condition threshold from a plurality of signal condition thresholds; and
   triggering, by the UE, one of:
      a 2-step RACH procedure in response to determining that the at least one signal condition parameter of the plurality of signal condition parameters meets the at least one signal condition threshold, or
      a 4-step RACH procedure in response to determining that the at least one signal condition parameter of the plurality of signal condition parameters does not meet the at least one signal condition threshold,
   wherein the plurality of signal condition parameters comprises a reference signal received power (RSRP) of the UE and at least one of a reference signal received quality (RSRQ) of the UE, a signal to interference and noise ratio (SINR) of the UE, or a pathloss at the UE.

2. The method as claimed in claim 1, wherein the plurality of signal condition parameters further comprises at least one of:
   a block error rate (BLER) of the UE,
   a channel quality index (CQI) estimated in a radio resource control (RRC) connected mode of the UE,
   a physical layer (L1) or layer 2 (L2) down link (DL) or uplink (UL) BLER of the UE,
   a transmission (Tx) power of the UE,
   a type of service, a transceiver resource manager module (TRM) switch requirement, or a wireless fidelity (WiFi) connectivity status of the UE.

3. The method as claimed in claim 1, wherein the determining, by the UE, of the plurality of signal condition parameters associated with the UE comprises:

determining, by the UE, whether the RSRP of the UE meets a RSRP threshold; and determining, by the UE, the plurality of signal condition parameters associated with the UE in response to determining that the RSRP of the UE meets the RSRP threshold.

4. The method as claimed in claim 2, wherein each signal condition of the plurality of signal condition thresholds is locally defined at the UE, the plurality of signal condition thresholds comprising at least one of:

a RSRP threshold remotely configured by a base station at the UE and a RSRQ threshold locally configured by the UE, a RSRP threshold remotely configured by the base station at the UE and a SINR threshold locally configured by the UE, a RSRP threshold remotely configured by the base station at the UE and a pathloss threshold locally configured by the UE, a RSRP threshold remotely configured by the base station at the UE and a CQI threshold locally configured by the UE, a RSRP threshold remotely configured by the base station at the UE and a block error rate (BLER) threshold locally configured by the UE, a RSRQ threshold locally configured by the UE, a SINR threshold locally configured by the UE, a pathloss threshold locally configured by the UE, a CQI threshold locally configured by the UE, wherein the CQI is estimated in a radio resource control (RRC) connected mode of the UE, a physical layer (L1) or layer 2 (L2) down link (DL) or uplink (UL) BLER threshold locally configured by the UE, a transmission (Tx) power threshold locally configured by the UE or at maximum transmit power limit (MTPL), a type of service is one of call service, data service, or a critical and delay intolerant service, or a transceiver resource manager module (TRM) switch is needed for a high priority task on another subscriber identity module (SIM) stack of the UE or the TRM switch is needed while a priority task is ongoing on a current SIM stack of the UE.

5. The method as claimed in claim 1, further comprising:

detecting, by the UE, whether the RACH procedure is triggered on a leg where 2-step RACH is configured on either a master cell group (MCG) or a secondary cell group (SCG), while the UE is in a dual connectivity (DC) mode; and performing, by the UE, one of:

revising dynamic power sharing thresholds to increase maximum transmit power limit (MTPL) or an actual Tx power limit on the leg where the 2-step RACH is configured, in response to determining that the RACH procedure is triggered on the leg where the 2-step RACH is configured, or maintaining default dynamic power sharing thresholds, in response to determining that the RACH procedure is not triggered on the leg where the 2-step RACH is configured.

6. The method as claimed in claim 1, further comprising:

detecting, by the UE, that the triggered 2-step RACH procedure has failed; and triggering, by the UE, the 4-step RACH procedure.

7. A user equipment (UE) for a random access channel (RACH) procedure in a wireless network, the UE comprising:

a memory;

a processor; and a RACH procedure controller, connected to the memory and the processor, configured to:

determine a plurality of signal condition parameters associated with the UE, determine whether at least one signal condition parameter of the plurality of signal condition parameters meets at least one signal condition threshold from a plurality of signal condition thresholds, and trigger one of:

a 2-step RACH procedure in response to determining that the at least one signal condition parameter of the plurality of signal condition parameters meets the at least one signal condition threshold, or a 4-step RACH procedure in response to determining that the at least one signal condition parameter of the plurality of signal condition parameters does not meet the at least one signal condition threshold, wherein the plurality of signal condition parameters comprises a reference signal received power (RSRP) of the UE and at least one of a reference signal received quality (RSRQ) of the UE, a signal to interference and noise ratio (SINR) of the UE, or a pathloss at the UE.

8. The UE as claimed in claim 7, wherein the plurality of signal condition parameters further comprises at least one of:

a block error rate (BLER) of the UE, a channel quality index (CQI) estimated in a radio resource control (RRC) connected mode of the UE, a physical layer (L1) or layer 2 (L2) down link (DL) or uplink (UL) BLER of the UE, a transmission (Tx) power of the UE, a type of service, a transceiver resource manager module (TRM) switch requirement, or a wireless fidelity (WiFi) connectivity status of the UE.

9. The UE as claimed in claim 7, wherein to determine the plurality of signal condition parameters associated with the UE, the RACH procedure controller is further configured to:

determine whether the RSRP of the UE meets a RSRP threshold, and determine the plurality of signal condition parameters associated with the UE, in response to determining that the RSRP of the UE meets the RSRP threshold.

10. The UE as claimed in claim 8, wherein each signal condition threshold of the plurality of signal condition thresholds is locally defined at the UE, the plurality of signal condition thresholds comprising at least one of:

a RSRP threshold remotely configured by a base station at the UE and a reference signal received quality (RSRQ) threshold locally configured by the UE, a RSRP threshold remotely configured by the base station at the UE and a SINR threshold locally configured by the UE, a RSRP threshold remotely configured by the base station at the UE and a pathloss threshold locally configured by the UE, a RSRP threshold remotely configured by the base station at the UE and a CQI threshold locally configured by the UE, a RSRP threshold remotely configured by a base station at the UE and a block error rate (BLER) threshold locally configured by the UE,
a RSRQ threshold locally configured by the UE,
a SINR threshold locally configured by the UE,
a pathloss threshold locally configured by the UE,
a CQI threshold locally configured by the UE, wherein the CQI is estimated in a radio resource control (RRC) connected mode of the UE,
a physical layer (L1) or layer 2 (L2) down link (DL) or uplink (UL) BLER threshold locally configured by the UE,
a transmission (Tx) power threshold locally configured by the UE 100 or at maximum transmit power limit (MTPL),
a type of service is one of call service, data service, or a critical and delay intolerant service, or
a transceiver resource manager module (TRM) switch is needed for a high priority task on another subscriber identity module (SIM) stack of the UE or the TRM switch is needed while a priority task is ongoing on a current SIM stack of the UE.

11. The UE as claimed in claim 7, wherein the RACH procedure controller is further configured to:
detect whether the RACH procedure is triggered on a leg where 2-step RACH is configured on either a master cell group (MCG) or a secondary cell group (SCG), while the UE is in a dual connectivity (DC) mode, and perform one of:
revise dynamic power sharing thresholds to increase maximum transmit power limit (MTPL) or an actual Tx power limit on the leg where the 2-step RACH is configured, in response to determining that the RACH procedure is triggered on the leg where the 2-step RACH is configured, or
maintain default dynamic power sharing thresholds, in response to determining that the RACH procedure is not triggered on the leg where the 2-step RACH is configured.

12. The UE as claimed in claim 7, wherein the RACH procedure controller is further configured to:
detect that the triggered 2-step RACH procedure has failed, and
trigger the 4-step RACH procedure.

\* \* \* \* \*